United States Patent [19]

Ito et al.

[11] Patent Number: 5,065,342

[45] Date of Patent: Nov. 12, 1991

[54] APPARATUS FOR PREPARING IMAGE REPRODUCTION DATA

[75] Inventors: Yousuke Ito; Ichiro Sasaki, both of Nagoya, Japan

[73] Assignee: Brother Kogyo Kabushiki Kaisha, Aichi, Japan

[21] Appl. No.: 487,199

[22] Filed: Mar. 1, 1990

[30] Foreign Application Priority Data

Mar. 6, 1989 [JP] Japan .................................. 1-53223

[51] Int. Cl.⁵ ................................................ G06F 3/14
[52] U.S. Cl. ..................................... 395/134; 340/728
[58] Field of Search ....................... 364/518, 521, 522; 340/728

[56] References Cited

U.S. PATENT DOCUMENTS

| | | | |
|---|---|---|---|
| 4,646,076 | 2/1987 | Wiedenman et al. | 340/728 X |
| 4,763,119 | 8/1988 | Matsubara et al. | 340/728 X |
| 4,887,228 | 12/1989 | Robert | 364/521 |
| 4,897,805 | 1/1990 | Wang | 364/521 |
| 4,962,468 | 10/1990 | Beuregard | 364/521 |

*Primary Examiner*—David L. Clark
*Attorney, Agent, or Firm*—Oliff & Berridge

[57] ABSTRACT

Apparatus for preparing image reproduction data from original image data which define visible representations to be reproduced, including a memory for storing original image data defining a plurality of visible representations each of which has at least one enclosed solid-imaging area to be solid-imaged, a first data preparing device for preparing solid-imaging data representative of the at least one solid-imaging area of a first kind of the visible representations, by effecting determination on the number of a winding count for the first kind of visible representations, based on the original image data, a second data preparing device for preparing solid-image data representative of the at least one solid-imaging area of a second kind of the visible representations, without effecting determination on the number of the winding count for the second kind of visible representations, based on the original image data, and a selector for selectively rendering operative one of the first and second data preparing means.

6 Claims, 7 Drawing Sheets

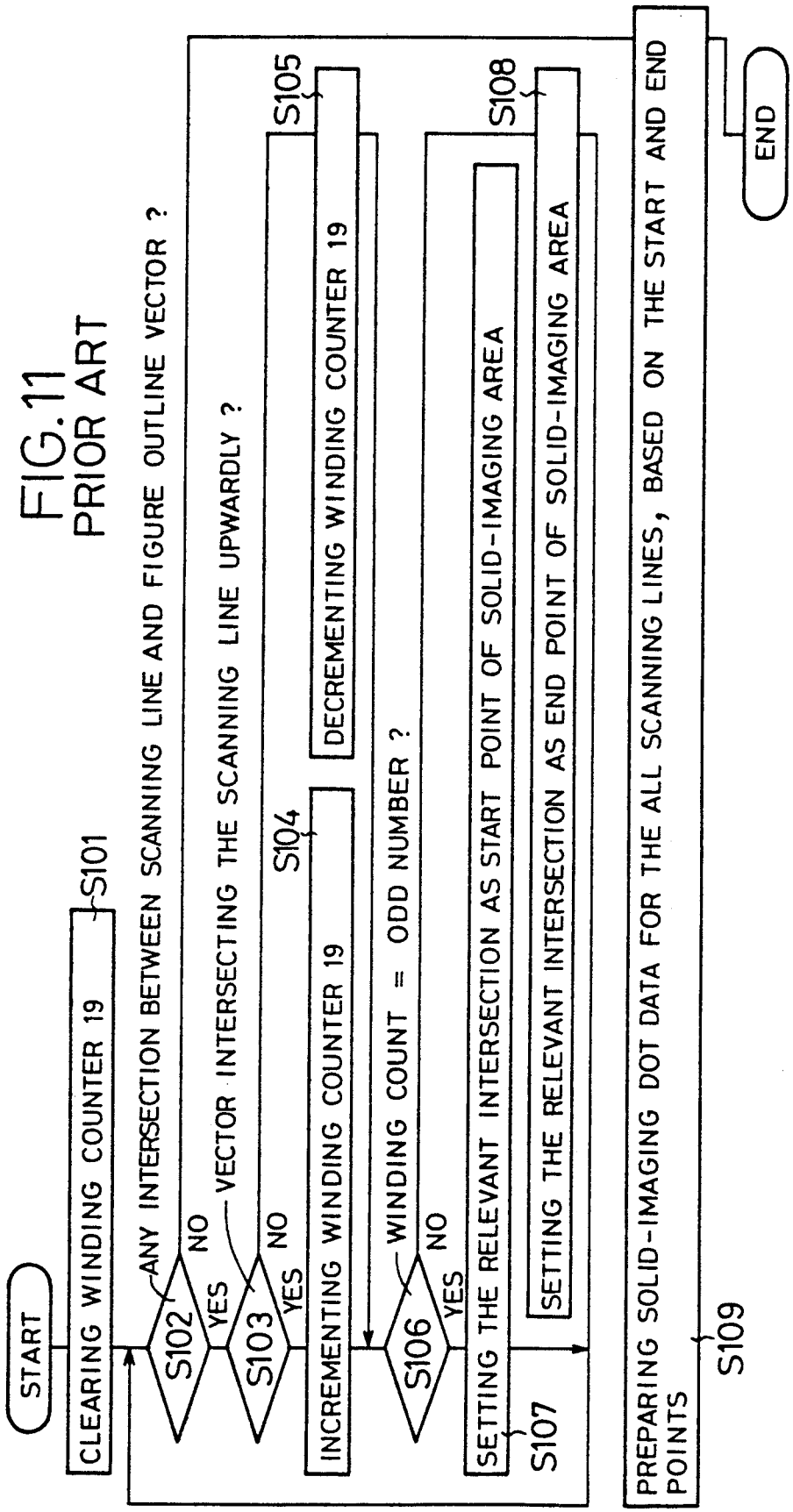

APPARATUS FOR PREPARING IMAGE REPRODUCTION DATA

BACKGROUND OF THE INVENTION

1. Field of the Invention

The present invention relates generally to an apparatus adapted to prepare image reproduction data used for reproducing images by an output device such as a cathode ray tube (CRT), a laser printer and an X-Y plotter. More particularly, the invention is concerned with data processing to prepare solid-imaging data for solid imaging in enclosed solid-imaging area or areas within the outline of a figure or other visible representation defined by original image data.

2. Discussion of the Prior Art

A figure or visible representation to be reproduced is widely defined by original image data in the form of vector data representative of vectors which represent a plurality of straight line segments each extending in a given direction from a specified start point to a specified end point, so that the straight line segments define the outline of the figure. Frequently, the outline of the figure thus defined by the vector data has one or more enclosed solid-imaging areas which are entirely illuminated, inked or otherwise solid-imaged by an output device. These solid-imaging areas are defined by solid-imaging data which are prepared from the vector data. When the output device such as a CRT or a printer is operated according to the solid-imaging data, a solid imaging is effected in a portion of a CRT screen or a recording medium corresponding to each enclosed solid-imaging area within the outline of the relevant figure. Namely, the solid-imaging data is used as image reproduction data for reproducing the figure. For convenience's sake, the figure whose enclosed solid-imaging area or areas have been solid-imaged will be referred to as "solid-imaged figure" as distinguished from the figure whose outline is merely defined by the original image data (vector data).

The solid-imaging data representative of the enclosed solid-imaging area or areas is prepared by a known method, in which the number of windings of the figure whose outline is defined by a plurality of vectors is calculated. The solid-imaging data is prepared based on the result of the calculation. For example, a FIG. 102 indicated in FIG. 7 is scanned along a multiplicity of parallel scanning lines 104 104, on which the outline of the FIG. 102 defined by vectors 106 is superimposed. For each scanning line 104, the number of intersections between that scanning line 104 and the vectors 106 is counted in positive and negative directions depending upon the direction in which each vector 106 intersects the scanning line 104. The thus counted number of intersections will be referred to as "winding count", and the solid-imaging area or areas of the figure 102 are determined based on the obtained winding count. In the example of FIG. 7, the winding count for each scanning line 104 is incremented when the relevant vector 106 intersects the scanning line 104 in the upward direction, and decremented when the vector 106 intersects the scanning line in the downward direction. As indicated in FIG. 7, the winding count outside the outline of the FIG. 102 is "0", while that inside the outline is "1". That is, the FIG. 102 has a single winding and a single solid-imaging area whose winding count is "1".

The determination of the solid-imaging area is made, for example, according to an "even-odd rule" or "non-zero winding rule". In the even-odd rule, each area of the figure whose winding count is an odd number is defined as a "solid-imaging area", and each area of the figure whose winding count is an even number is defined as a "non-solid-imaging area". In the non-zero winding rule, an area of the figure whose winding count is other than "0" is defined as the solid-imaging area, while an area of the figure whose winding count is "0" is defined as the non-solid-imaging area.

When the solid-imaging data prepared according to the even-odd rule, for example, is executed, the enclosed area of the FIG. 102 whose winding count is "1" is solid-imaged as indicated by hatched lines. FIGS. 8 and 9 illustrate FIGS. 108 and 110 which have one enclosed solid-imaging area and two enclosed solid-imaging areas, respectively. These solid-imaging areas are also indicated by hatched lines. In the case of FIG. 8, the solid-imaging area is represented by the odd winding count "1" as indicated at (1). In the case of FIG. 9, the solid-imaging areas are represented by the odd winding counts "1" and "2" as indicated at (1) and (3).

The same result as obtained according to the even-odd rule is obtained with respect to the FIGS. 102 and 108 of FIGS. 7 and 8, where the non-zero winding rule is applied. In the case of the FIG. 110, the solid-imaging data prepared according to the non-zero winding rule is different from that prepared according to the odd-even rule. Namely, three solid-imaging areas are obtained according to the non-zero winding rule, as indicated at (1), (2) and (3) in FIG. 10.

A control program for preparing the solid-imaging data according to the even-odd rule is illustrated in the flow chart of FIG. 11. Initially, a counter for counting the winding count for each scanning line is cleared or reset to zero in step S101. Then, in steps S102 through S105, the winding count for each scanning line is incremented or decremented depending upon the direction in which the vectors defining the outline of a figure in question intersect the relevant scanning line. In the following steps S106, S107 and S108, each intersection of the scanning line with the appropriate vector is set as the start or end point of a solid-imaging area as viewed along that scanning line, depending upon whether the current winding count is an odd number or an even number. After the settings in steps S107 and S108 are completed for all the scanning lines which intersect the outline of the figure, solid-imaging data for the figure are prepared based on the settings obtained in steps S107 and S108. Namely, the solid-imaging data for a solid-imaging area or areas of the figure are prepared.

However, the known method as described above for preparing the image reproduction data from the original image data suffers from low efficiency due to a considerably long time required for preparing the solid-imaging data. It is noted that the determination as to whether the winding count for each scanning line is an odd or even number is required for only such figures as the FIGS. 108 and 110 of FIGS. 8 and 9, whose vectorial outline has two or more maximal values (and two or more minimal values). In this respect, the number of the maximal values of a figure are always equal to that of the minimal values of the figure. In other words, the determination indicated above is not required for figures having simple outlines such as rectangular or circular shapes, or for figures as the FIG. 102 of FIG. 7, whose vectorial outline is complicated but has only one maximal value and only one minimal value. It is evident that the outline of these figures has only two intersections with respect to each scanning line, and that the above determination as to the winding count is not necessary to prepare the solid-imaging data that define an enclosed solid-imaging area between the two intersections of each scanning line. In spite of this fact, however, the known apparatus to prepare the solid-imaging data is adapted to make the same determination as required for the complicated figures like the figures of FIGS. 8 and 9, even for those figures which do not actually require the determination to prepare the solid-imaging data. Accordingly, the preparation of the solid-imaging data takes a considerable time. For instance, the preparation of the solid-imaging data for the FIG. 102 of FIG. 7 requires that steps S102 through S108 of the flow chart of FIG. 11 be repeated two times for each scanning line 104, resulting in a relatively long time spent in preparing the solid-imaging data for all the scanning lines 104 intersecting the FIG. 102.

SUMMARY OF THE INVENTION

It is therefore an object of the present invention to provide an apparatus which is capable of preparing, in a reduced length of time, image reproduction data in the form of the solid-imaging data from vector data or other original image data which define a visible representation to be reproduced.

The above object may be achieved according to the principle of the present invention, which provides an apparatus for preparing image reproduction data from original image data which define visible representations to be reproduced, comprising: (a) memory means for storing original image data defining a plurality of visible representations each of which has at least one enclosed solid-imaging area to be solid-imaged; (b) first data preparing means for preparing solid-imaging data representative of the at least one solid-imaging area of a first kind of the plurality of visible representations, by effecting determination on the number of a winding count for the first kind of visible representations, based on the original image data; (c) second data preparing means for preparing solid-imaging data representative of the at least one solid-imaging area of a second kind of the plurality of visible representations, without effecting determination on the number of the winding count for the second kind of visible representations, based on the original image data; and (d) selector means selectively rendering operative one of the first and second data preparing means.

The term "visible representation" used herein is interpreted to mean figures, devices and other graphical representations, and also means letters, numerals and other characters each consisting of a plurality or multiplicity of component segments or geometrical parts. The term "original image data" used herein is interpreted to mean not only vector data defining the outline of a visible representation, but also a combination of code data indicative of the shape or profile of the figures or other visible representations such as rectangular or circular shapes, and coordinate data representative of coordinates at which the visible representations are formed or reproduced, or other data which define the visible representations to be reproduced.

In the apparatus of the present invention constructed as described above, the determination on the winding count is effected only when the first data preparing means is selected by the selector means, but the determination is not effected when the second data preparing means is selected.

In the case where the determination on the winding count is omitted, the cycle time for preparing the solid-imaging data for the relevant visible representation is considerably reduced, as compared with that for preparing the solid-imaging data by effecting the determination on the winding count. Accordingly, the overall or average time required by the present apparatus for preparing the solid-imaging data for a large number of visible representations is significantly reduced as compared with that required by the conventional counterpart. Generally, more than 80% of the visible representations to be reproduced have circular, rectangular or other simple shapes or configurations, or shapes whose outline has a single maximal or minimal value. These simple visible representations do not require the determination on the winding count of the outline, when the solid-imaging data is prepared from the original image data. Accordingly, the present apparatus provides a significant saving in the data processing time for preparing the image reproduction data which include the solid-imaging data.

Where the original image data for each of the plurality of visible representations comprises code data indicative of one of the above-indicated first and second kinds, the selector means may comprise determining means for determining whether the code data is indicative of the first kind, or the second kind. In this case, the selector means renders operative the first data preparing means if the determining means determines that the code data is indicative of the first kind, and renders operative the second data preparing means if the determining means determines that the code data is indicative of the second kind. For example, the visible representations of the first kind consist of figures each of which has a simple outline having only one maximal value and only one minimal value, while the visible representations of the second kind consist of figures other than the figures of the first kind.

Alternatively, the selector means may comprise determining means for determining whether or not an outline of each of the plurality of visible representations has a plurality of maximal values or a plurality of minimal values. In this case, the selector means renders operative the first data preparing means if the determination means determines that the outline has the plurality of maximal or minimal values, and renders operative the second data preparing means if the determining means determines that the outline does not have the plurality of maximal or minimal values. The original image data for each of the plurality of visible representations may comprise vector data representative of vectors defining segments of the outline of each visible representation. In this instance, the determining means may determine whether or not the outline of each visible representation has the plurality of maximal or minimal values, on the vector data.

Further, apparatus may comprise suitable operator-controlled means through which the operator of the apparatus data indicative of whether the determination on the winding count should be made for a given visible representation, or not, that is, the data according to which the selector means selects the first data preparing means, or the second data preparing means.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which:

FIG. 11 is a flow chart illustrating a program for preparing the solid-imaging data according to a known method, which program is also stored in the read-only memory of the apparatus of FIG. 1 according to the present invention.

DESCRIPTION OF THE PREFERRED EMBODIMENT

Figure 1:
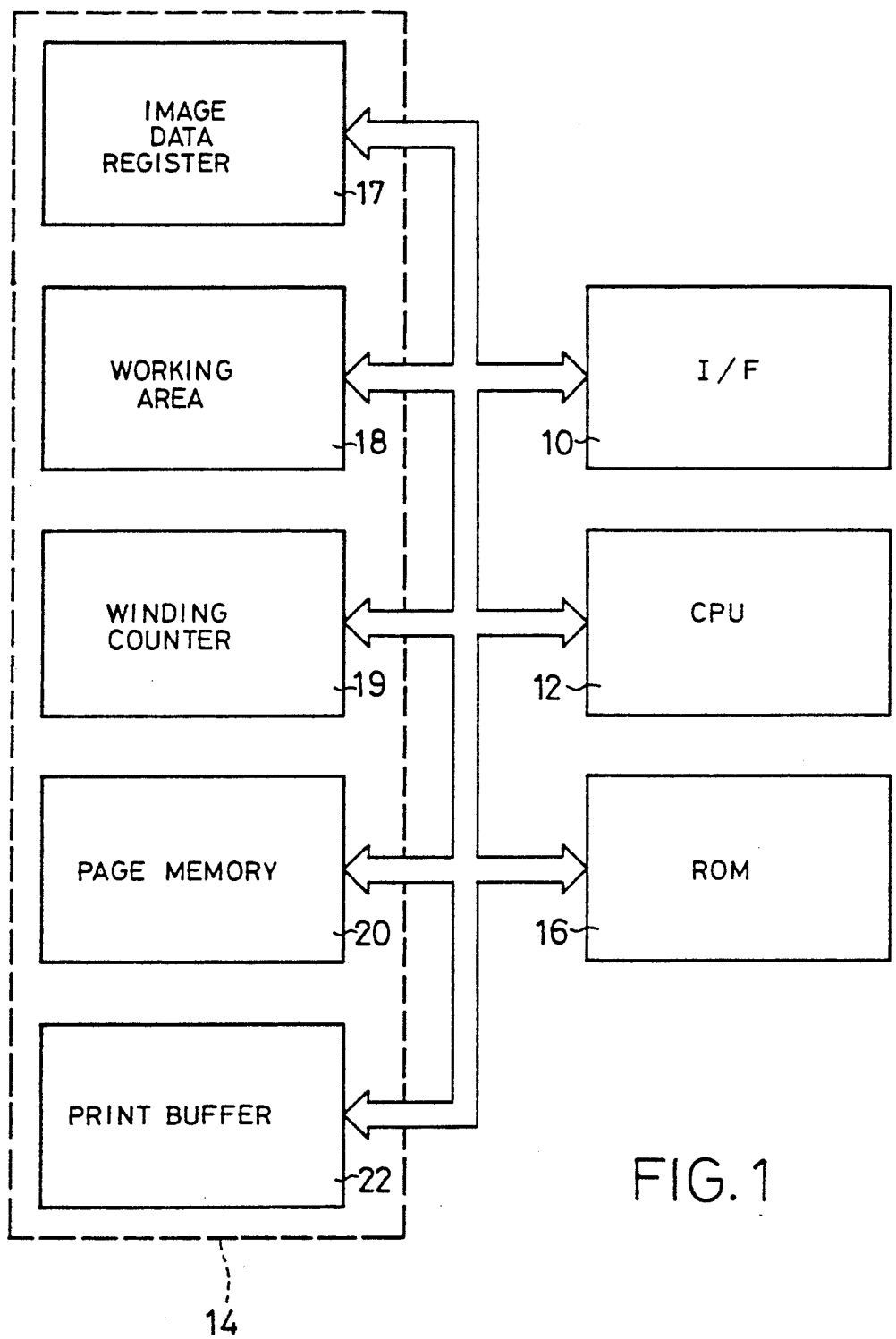
FIG. 1 is a schematic block diagram illustrating an apparatus for preparing image reproduction data, which is constructed according to one embodiment of the invention.

Referring first to FIG. 1, there is shown the presently preferred embodiment of the invention, in the form of an apparatus adapted to prepare image reproduction data used for a laser printer. The apparatus has an interface 10 through which the apparatus is connected to a personal computer, a word processor, or any other external data supply device from which original image data in the form of printing data are received. The interface 10 is connected to a central processing unit 12 (CPU), a random-access memory 14 (RAM) and a read-only memory 16 (ROM). The RAM 14 includes an IMAGE DATA register 17, a WORKING area 18, a WINDING counter 19, a PAGE memory 20 and a PRINT buffer 22.

Figure 2:
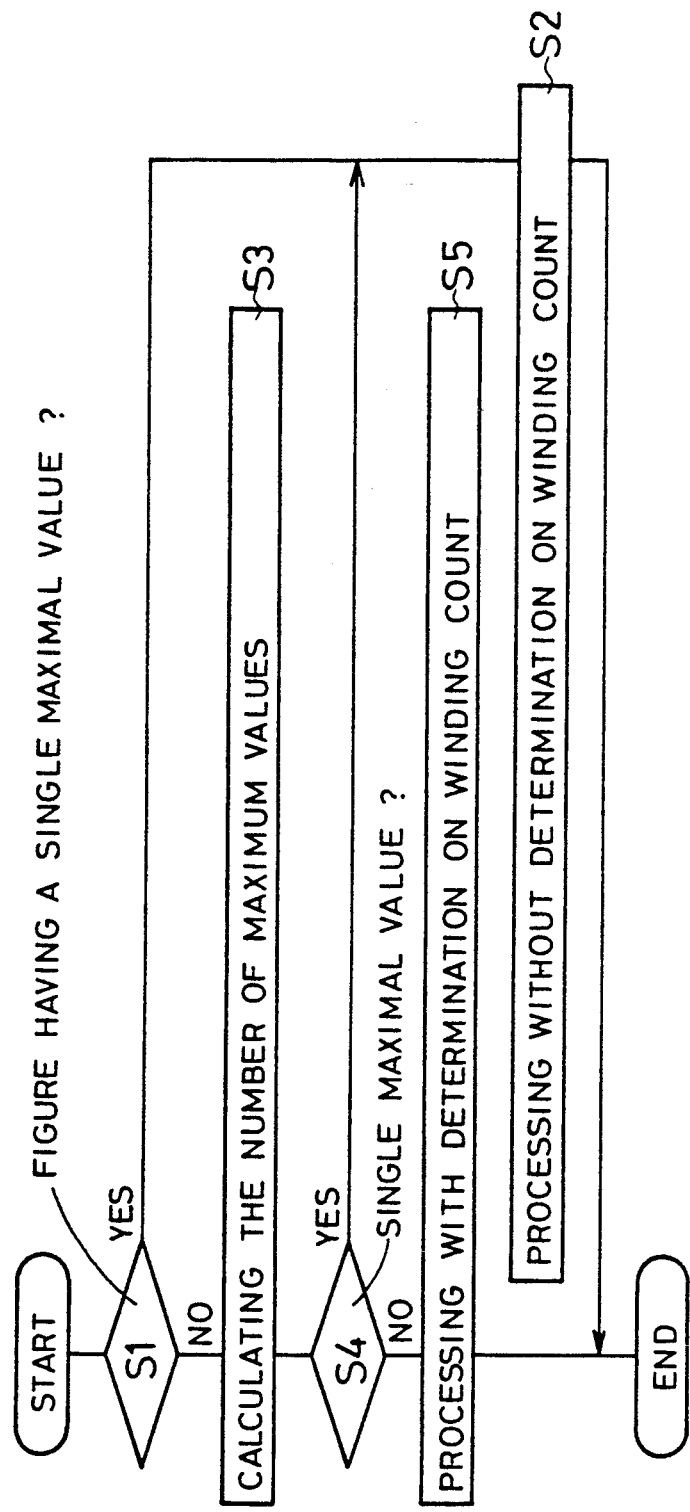
FIGS. 2 and 3 are flow charts indicating control programs stored in a read-only memory of the apparatus of FIG. 1.
Figure 3:
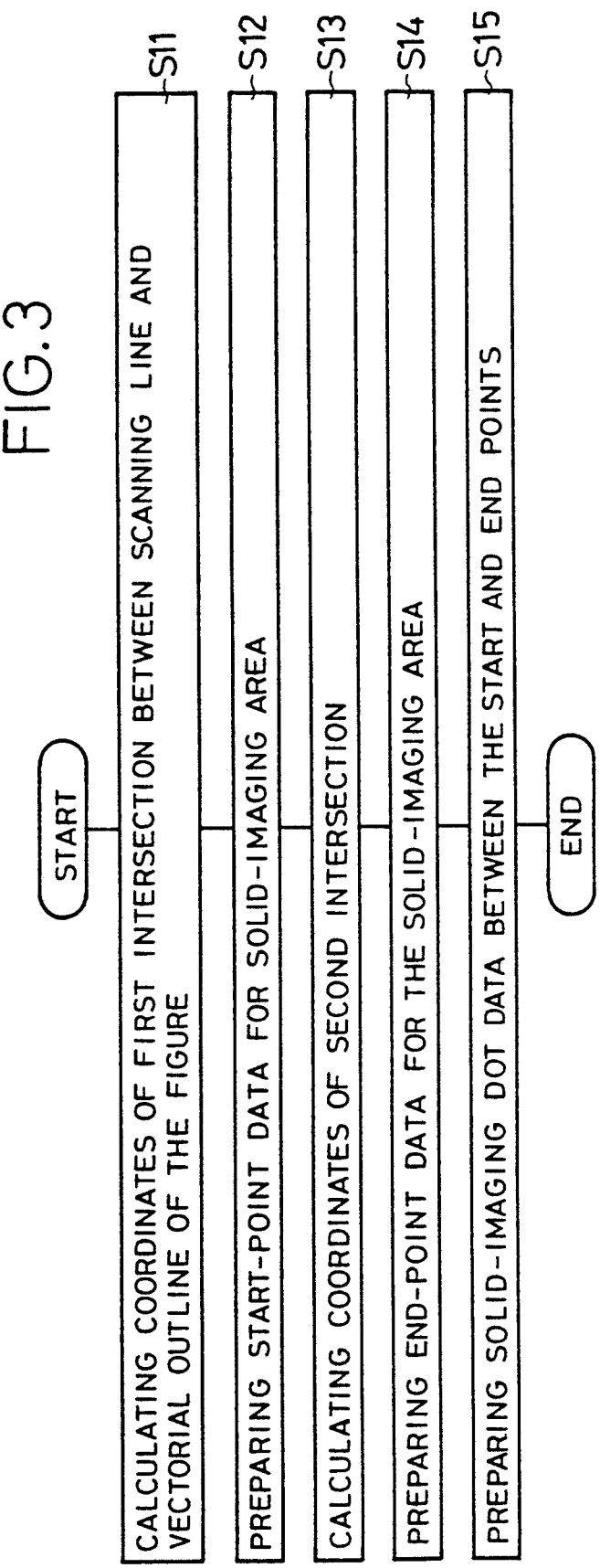

The ROM 16 stores various control programs such as the programs indicated by the flow charts of FIGS. 2 and 3 and the program indicated by the flow chart of FIG. 11. The CPU 12, which operates according to these control programs, receives from the external data supply device the printing data, and stores original image data of the received data into the IMAGE DATA memory 17. The original image data represent figures to be reproduced. The CPU 12 sequentially processes the original image data stored in the IMAGE DATA memory 17, for preparing the corresponding image reproduction data in the form of solid-imaging data, while utilizing the temporary data storage function of the WORKING area 18. The prepared solid-imaging data are stored in the PAGE memory 20. The PAGE memory 20 has memory locations in which are stored data bits corresponding to picture elements, which are minimum printing spots at which the corresponding image dots are selectively formed by the laser printer. The solid-imaging data take the form of dot data which indicate whether the image dots are formed at the appropriate printing spots, or not. Upon printing, sets of the dot data are read out from the PAGE memory 20 one after another, and temporarily stored in the PRINT buffer 22, from which the dot data are supplied to the laser printing head of the printer, so that the lines of images are printed one after another according to the dot data.

Figure 4:
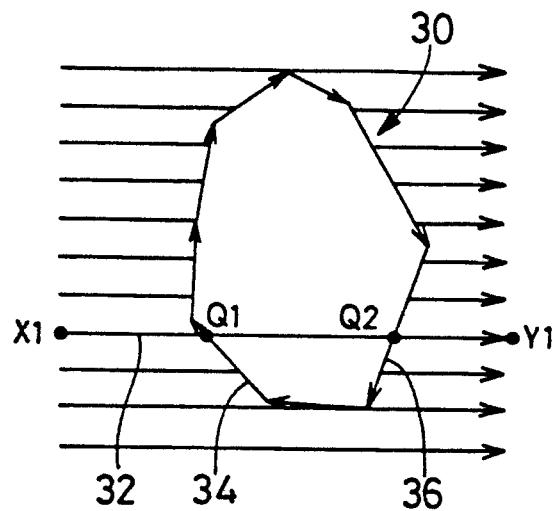
FIGS. 4 through 6 are illustrations for explaining the operation of the apparatus Of FIG. 1.
Figure 5:
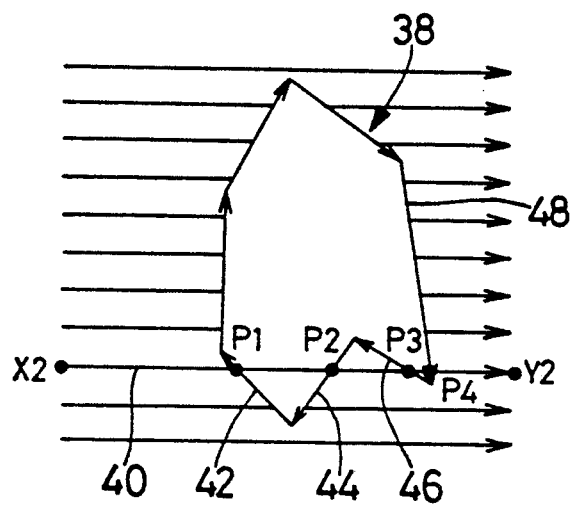

There will be described an operation of the present data preparing apparatus, by reference to the flow charts of FIGS. 2, 3 and 11 and the illustrations in FIGS. 4 through 6.

For each figure whose outline is defined by the appropriate batch of original image data stored in the IMAGE DATA register 17, a control routine illustrated in the flow chart of FIG. 2 is executed. Initially, step S1 is implemented to determine whether it is apparent or not that the relevant figure has only one maximal value. The figure is defined by code data representative of the kind of the figure, and code data representative of the size and printing position of the figure. If the appropriate code data representative of the kind of the figure indicates that the figure defined by the image data is a simple figure such as a circle and a rectangle, an affirmative decision (YES) is obtained in step S1. In this case, the control flow goes to step S2 in which a processing operation which does not include determination on the winding count for each scanning line will be executed as described below by reference to FIG. 3.

Figure 7:
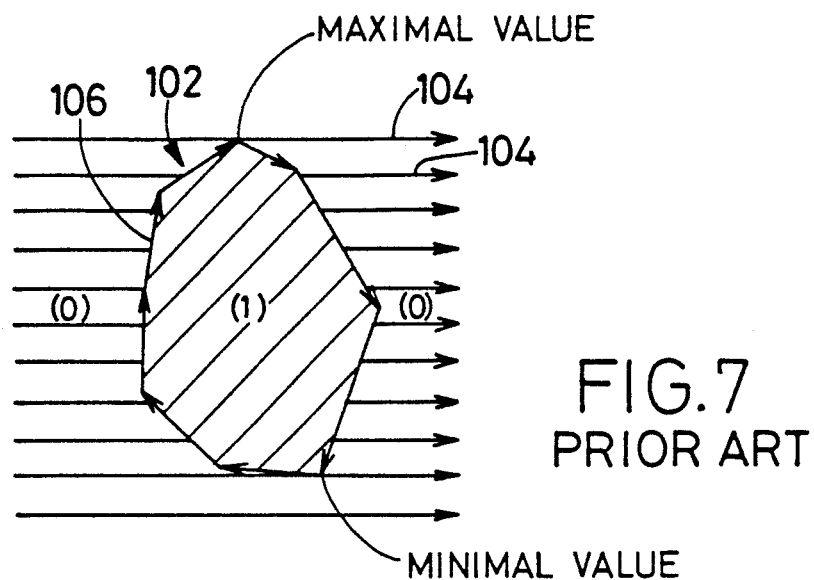
FIGS. 7 through 10 are views showing a method of preparing solid-imaging data for general figures to be reproduced.
Figure 8:
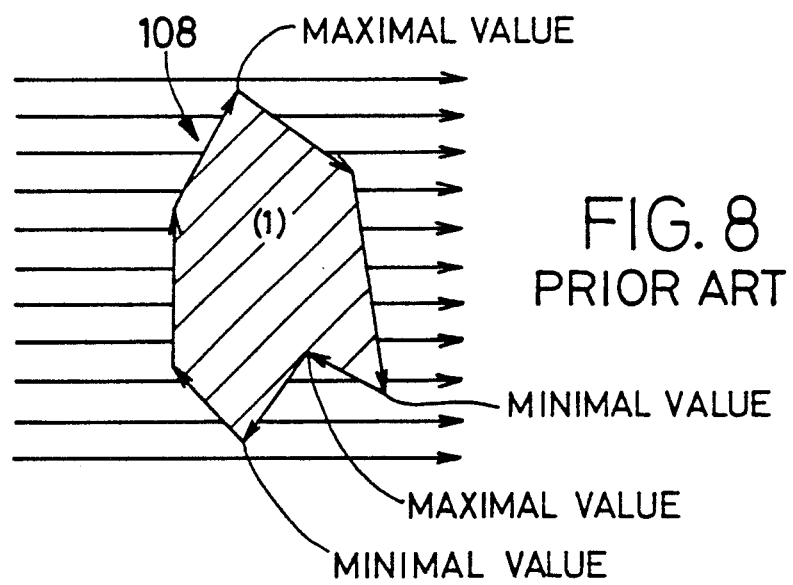
Figure 9:
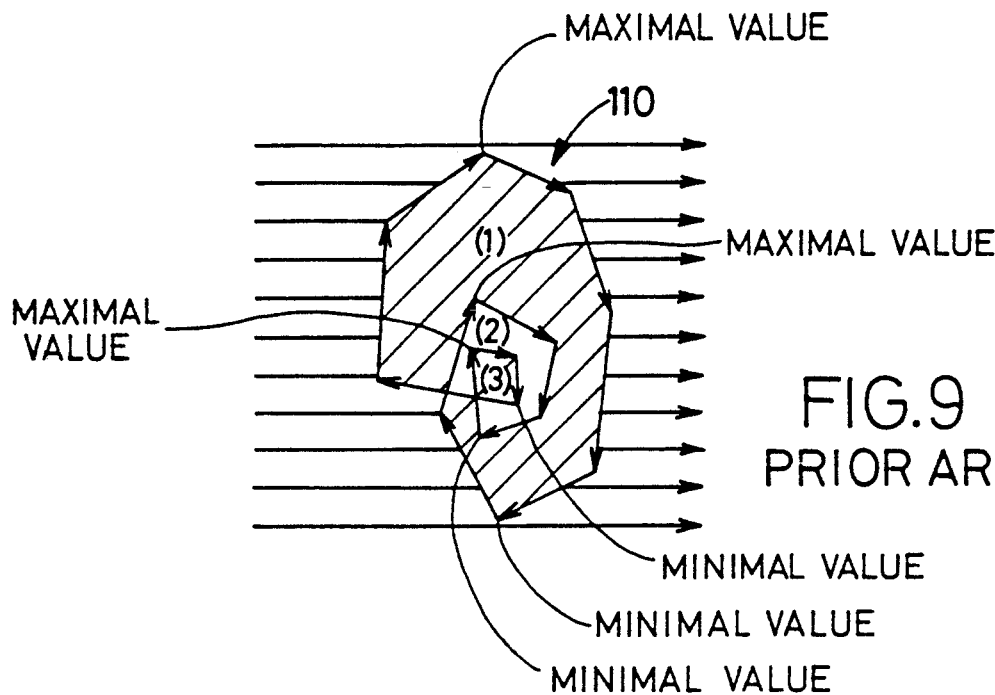
Figure 10:
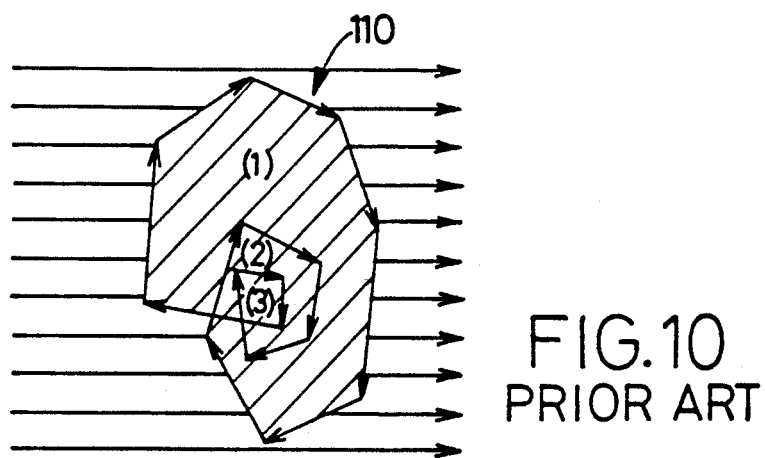

If the image data include vector data representative of a plurality of vectors indicative of straight line segments representing the outline of the figure, on the other hand, a negative decision (NO) is obtained in step S1, and the control flow goes to step S3 in which the number of maximal values of the vectorial outline of the figure is calculated. In this respect, it is noted that a maximal value appears at each point of the vectorial outline at which the direction of the relevant vector changes from the upward direction to the downward direction as viewed in the direction perpendicular to the scanning lines, as indicated in FIG. 7, for example. Accordingly, the number of the maximal points is calculated by counting those points of the vectorial outline. Where the outline includes a curved segment, the curved segment is approximated by a plurality of straight line segments, and the number of the maximal values is obtained based on the vectors representative of these straight line segments.

Step S3 is followed by step S4 to determine whether the calculated number of maximal values is equal to "1" or not. If an affirmative decision (YES) is obtained, that is, if the relevant figure has only one maximal value and is therefore a simple figure, step S4 is followed by step S2 to effect the processing without the determination on the winding count. If the calculated number obtained in step S3 is larger than "1", that is, the relevant figure has two or more maximal values, the control flow goes to step S5 in which a data processing operation involving the determination on the winding count will be executed as described below by reference to FIG. 11. It is noted that step S3 is adapted such that there exists only one maximal value where a maximal value appears on a straight line segment of the vectorial outline of the figure parallel to the scanning lines.

The data processing operation in step S2 which is effected without the determination on the winding count is illustrated in the flow chart of FIG. 3. An example of the data processing for preparing solid-imaging data without the determination of the winding count will be described with respect to a FIG. 30 as illustrated in FIG. 4. The FIG. 30 is superimposed on horizontal scanning lines 32. A control routine of the flow chart of FIG. 3 is implemented for each scanning line 32. When the FIG. 30 is scanned along the scanning line 32 which extends from point X1 to point Y1, for example, step S11 is initially executed to calculate coordinates of a first intersection point Q1 between the scanning line 32 and a vector 34. Then, step S12 is executed to prepare start-point data, based on the calculated coordinates of the intersection point Q1, such that the start-point data represent the start point of an enclosed solid-imaging area, which start point is located at the coordinates of a picture element whose center is nearest to the intersection point Q1 and inside the vectorial outline of the FIG. 30. The prepared start-point data are stored in the WORKING area 18 of the RAM 14 of the apparatus.

Similarly, end-point data for the same scanning line 32 is prepared in steps S13 and S14 such that the end-point data represent the end point of the solid-imaging area, which end point is located at the coordinates of a picture element which is nearest to a second intersection point Q2 between the scanning line and the vectorial outline of the FIG. 30 and is inside the vectorial outline. The prepared end-point data is also stored in the WORKING area 18. Based on the start-point data and end-point data stored in the WORKING area 18, the solid-imaging data for the relevant scanning line 32 is prepared in step S15, so that image dots are formed at all the picture element positions (printing spots) between the start and end points represented by the start-point and end-point data. More specifically, the bits of the dot data at the memory locations of the PAGE memory 20 which correspond to those picture element positions are set to "1", which indicates the presence of the image dot. Thus, the solid-imaging dot data as the image reproduction data used by the laser printer is prepared for each scanning line. No further description of the preparation of the solid-imaging data or dot data is deemed necessary for understanding the principle of the present invention. Details of the manner of preparing the dot data are described in copending U.S. patent application No. 425,604.

The control routine of the flow chart of FIG. 3 is executed for all the scanning lines which intersect the FIG. 30, the preparation of the solid-imaging data (dot data) for the FIG. 30 is completed.

Referring to the flow chart of FIG. 11, there will be described the control routine for the data processing in step S5 which involves the determination on the winding count for each scanning line.

Initially, step S101 is implemented to clear the WINDING counter 19. Then, step S102 is implemented to determine whether there exists any intersection between the current scanning line and the vectorial outline of a figure to be reproduced. For example, there are four intersections P1, P2, P3 and P4 between a scanning line 40 extending from point X2 to point Y2, and the vectorial outline of a FIG. 38 shown in FIG. 5. In this example, therefore, an affirmative decision (YES) is obtained in step S102. Accordingly, the control flow goes to step S103 to determine whether the outline intersects the relevant scanning line 40 in the upward direction, or not, namely, whether vectors 42, 44, 46 and 48 corresponding to the intersections P1, P2, P3 and P4 intersect the scanning line 40 in the upward direction, or in the downward direction. When step S103 is implemented for the first and third intersections P1 and P3, an affirmative decision (YES) is obtained since the vectors 42 and 46 intersect the scanning line 40 in the upward direction. In this case, step S103 is followed by step S104 in which the WINDING counter 19 is incremented. When step S103 is implemented for the second and fourth intersections P2 and P4, a negative decision (NO) is obtained since the vectors 44 and 48 intersect the scanning line 40 in the downward direction. In this latter case, step S103 is followed by step S105 in which the WINDING counter 19 is decremented.

Steps S104 and S105 are followed by step S106 to determine whether the current count of the WINDING counter 19 is an odd number or not. For the first intersection P1, an affirmative decision (YES) is obtained in step S106, and step S107 is executed to prepare start-point data such that the start-point data represent a start-point of an enclosed solid-imaging area, which is located at the coordinates of a picture element whose center is nearest to the intersection point P1 and inside the vectorial outline of the FIG. 38. The prepared start-point data is stored in the WORKING area 18 of the RAM 14. For the intersection P2, a negative decision (NO) is obtained in step S106, and step S108 is executed to prepare end-point data, such that the end point data represent an end point of the solid-imaging area, which is located at the coordinates of a picture element whose center is nearest to the intersection P1 and inside the outline of the FIG. 38. The prepared end-point data is stored in the WORKING area 18. Similarly, start-point data and end-point data representing a second start-point and a second end-point of the solid-imaging area are prepared for the third and fourth intersections P3 and P4.

When a negative decision (NO) is eventually obtained in step S102, and the control flow goes to step S109 in which solid-imaging dot data for the enclosed solid-imaging area of the FIG. 38 are prepared for the relevant scanning line 40 and are stored in the PAGE memory 20.

After the solid-imaging dot data for the FIG. 38 are prepared for all the scanning lines 40, a laser print operation is performed according to the prepared image reproduction data in the form of the solid-imaging dot data, whereby the FIG. 38 is reproduced on a recording medium.

Figure 6:
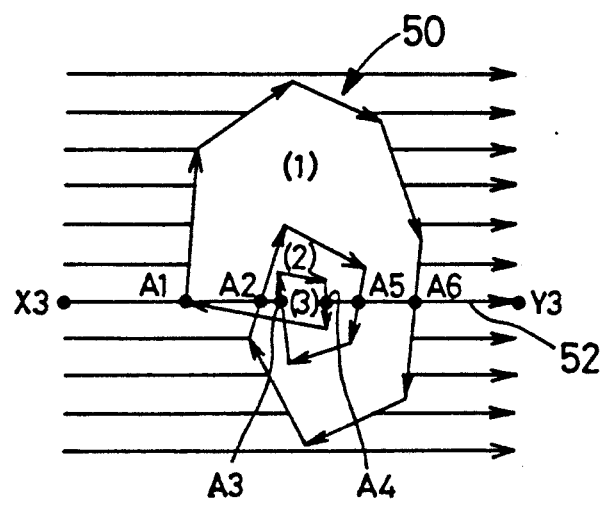

The data processing with the determination on the winding count is effected for a FIG. 50 indicated in FIG. 6. For this FIG. 50, solid-imaging dot data may be prepared in the same manner as described above, when the control routine of the flow chart of FIG. 11 is executed. For instance, solid-imaging dot data is prepared for a scanning line 52 extending from point X3 to point Y3, such that the dot data represents image dots between first and second intersections A1 and A2, image dots between third and fourth intersections A3 and A4, and image dots between fifth and sixth intersections A5 and A6. Namely, dot data bits at the memory locations of the PAGE memory 20 are set to "1" for the picture elements which are located within two enclosed solid-imaging areas, whose winding count is an odd number as indicated at (1) and (3) in FIG. 6. When printing is performed according to the solid-imaging dot data, the solid-imaging areas (1) and (3) are solid-imaged with a suitable inking material, for example.

It will be understood from the above description that the IMAGE DATA register 17 constitutes memory means for storing original image data representative of the outline of a figure, and portions of the CPU 12 and ROM 16 assigned to execute steps S1, S3 and S4 of FIG. 2 constitute selector means for selecting an adequate one of the two different modes of data processing operations in steps S2 and S5, as described above. Further, the WINDING counter 19, PAGE memory 20 and portions of the CPU 12 and ROM 16 assigned to execute step S5 constitute first data preparing means for preparing solid-imaging dot data according to the control routine of FIG. 11. Further, the PAGE memory 20 and portions of the CPU 12 and ROM 16 assigned to execute step S2 constitute second data preparing means for preparing solid-imaging dot data according to the control routine of FIG. 3.

While the present invention has been described in the presently preferred embodiment, it is to be understood that the invention is not limited to the details of the illustrated embodiments, but may be otherwise embodied, with various changes, modifications and improvements, which may occur to those skilled in the art, without departing from the spirit and scope of the invention defined in the following claims.

What is claimed is:

1. An apparatus for preparing image reproduction data from original image data which define visible representations to be reproduced, comprising:

memory means for storing original image data defining a plurality of visible representations each of which has at least one enclosed solid-imaging area to be solid-imaged;

first data preparing means for preparing solid-imaging data representative of said at least one solid-imaging area of a first kind of said plurality of visible representations, by effecting determination on the number of a winding count for said first kind of visible representations, based on said original image data;

second data preparing means for preparing solid-imaging data representative of said at least one solid-imaging area of a second kind of said plurality of visible representations,, without effecting determination on the number of said winding count for said second kind of visible representations, based on said original image data; and selector means for selectively rendering operative one of said first and second data preparing means, said original image data for each of said plurality of visible representations further comprising code data indicative of one of said first and second kinds, and said selector means comprises determining means for determining whether said code data are indicative of said first kind, or said second kind, said selector means rendering operative said first data preparing means if said determining means determines that said code data are indicative of said first kind, and rendering operative said second data preparing means if said determining means determines that said code data are indicative of said second kind.

2. An apparatus according to claim 1, wherein said visible representations of said first kind consist of first figures each of which has a simple outline having only one maximal value and only one minimal value, while said visible representations of said second king consist second figures other than said first figures.

3. An apparatus according to claim 1, wherein said selector means comprises determining means for determining whether or not an outline of each of said plurality of visible representations has a plurality of maximal values or a plurality of minimal values, said selector means renders operative said first data preparing means if said determining means determines that said outline has said plurality of maximal or minimal values, and renders operative said second data preparing means if said determining means determines that said outline does not have said plurality of maximal or minimal values.

4. An apparatus according to claim 3, wherein said original image data for each of said plurality of visible representations comprises vector data representative of vectors defining segments of said outline of each said visible representation, and said determining means determines whether or not said outline has said plurality of maximal or minimal values, based on said vector data.

5. An apparatus according to claim 1, wherein said original image data for each of said plurality of visible representations comprises vector data representative of vectors defining segments of an outline of each of said visible representations, said first data preparing means comprises counting means for counting the number of said winding count for each scanning line intersecting said outline, such that said winding count is incremented when one of said vectors intersects each said scanning line in one of opposite directions as viewed in a direction perpendicular to said scanning line, while said winding count is decremented when one of said vectors intersects each said scanning line in the other of said opposite directions.

6. An apparatus according to claim 1, wherein said solid-imaging data comprises dot data representative of a presence or absence of an image dot at each of picture element positions which are equally spaced from each other along each said scanning line, said first and second data preparing means preparing said dot data such that said dot data represent the presence of said image dots at all picture element positions which are located within each of said at least one enclosed solid-imaging area of each said visible representation.

* * * * *